(12) United States Patent
Haven

(10) Patent No.: US 7,796,119 B2
(45) Date of Patent: *Sep. 14, 2010

(54) POSITION DETERMINATION WITH REFERENCE

(75) Inventor: Richard E. Haven, Sunnyvale, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 793 days.

This patent is subject to a terminal disclaimer.

(21) Appl. No.: 11/396,448

(22) Filed: Apr. 3, 2006

(65) Prior Publication Data

US 2007/0242034 A1   Oct. 18, 2007

(51) Int. Cl.
    *G09G 5/08* (2006.01)
(52) U.S. Cl. .................. 345/163; 345/156; 345/157
(58) Field of Classification Search .......... 345/156, 345/157–184; 398/167, 170; 356/152.3; 359/529; 715/863
    See application file for complete search history.

(56) References Cited

U.S. PATENT DOCUMENTS

| | | | |
|---|---|---|---|
| 3,690,767 A * | 9/1972 | Missio et al. ............. 356/5.08 |
| 4,436,417 A * | 3/1984 | Hutchin ..................... 356/4.09 |
| 4,709,580 A * | 12/1987 | Butts et al. ................ 73/178 R |
| 4,733,236 A | 3/1988 | Matosian |
| 4,823,170 A | 4/1989 | Hansen |
| 5,072,109 A | 12/1991 | Aguilera, Jr. et al. |
| 5,148,016 A * | 9/1992 | Murakami et al. .......... 250/221 |
| 5,207,003 A | 5/1993 | Yamada et al. |
| 5,267,014 A | 11/1993 | Prenninger |
| 5,530,774 A | 6/1996 | Fogel |
| 5,570,113 A * | 10/1996 | Zetts .......................... 345/173 |
| 5,719,954 A | 2/1998 | Onda |
| 5,734,736 A | 3/1998 | Palmer et al. |
| 5,821,922 A * | 10/1998 | Sellers ....................... 345/157 |
| 5,920,394 A * | 7/1999 | Gelbart et al. ............. 356/615 |
| 6,061,644 A * | 5/2000 | Leis ........................... 702/153 |
| 6,066,842 A * | 5/2000 | Livingston ............... 250/203.2 |
| 6,134,507 A | 10/2000 | Markey et al. |
| 6,285,959 B1 | 9/2001 | Greer et al. |
| 6,344,846 B1 * | 2/2002 | Hines ........................ 345/166 |
| 6,741,755 B1 | 5/2004 | Blake |
| 6,750,848 B1 * | 6/2004 | Pryor ........................ 345/168 |
| 6,791,531 B1 * | 9/2004 | Johnston et al. ............. 345/157 |
| 7,012,695 B2 | 3/2006 | Maier |
| 7,217,913 B2 | 5/2007 | Fouquet |
| 7,273,176 B2 | 9/2007 | Eisenberg |
| 7,473,884 B2 * | 1/2009 | Fouquet et al. ............. 250/221 |
| 7,609,249 B2 | 10/2009 | Fouquet et al. |
| 2002/0036617 A1 | 3/2002 | Pryor |

(Continued)

FOREIGN PATENT DOCUMENTS

EP          0329540         8/1989

(Continued)

*Primary Examiner*—Amare Mengistu
*Assistant Examiner*—Koosha Sharifi

(57) ABSTRACT

A system for generating position information includes a first set of image data, a second set of image data, and a processor. The first set of image data is generated to indicate the position of a surface plane marker. The second set of image data is generated to indicate the position of a retroreflector. The processor is configured to receive the first and second sets of image data and to generate position information indicative of the relative position of the surface plane marker relative to the retroreflector.

17 Claims, 4 Drawing Sheets

| U.S. PATENT DOCUMENTS | | | | FOREIGN PATENT DOCUMENTS | | |
|---|---|---|---|---|---|---|
| 2002/0190254 A1 | 12/2002 | Turner et al. | | EP | 0650010 | 4/1995 |
| 2004/0046736 A1 | 3/2004 | Pryor et al. | | EP | 1 452 127 A1 | 4/2004 |
| 2004/0070509 A1 | 4/2004 | Grace et al. | | EP | 1 526 355 A1 | 4/2005 |
| 2004/0145722 A1 | 7/2004 | Uomori et al. | | GB | 2372656 | 8/2002 |
| 2004/0170304 A1 | 9/2004 | Haven et al. | | JP | 6249616 | 1/2001 |
| 2005/0249377 A1 | 11/2005 | Fouquet et al. | | WO | WO-87/02484 | 4/1987 |
| 2005/0249384 A1 | 11/2005 | Fouquet et al. | | WO | WO-02/036617 | 5/2002 |

\* cited by examiner

POSITION DETERMINATION WITH REFERENCE

BACKGROUND

Most position tracking systems used with a graphical user interface (GUI) utilize a mouse to generate two-dimensional position information. The mouse is typically tethered to the computer by an electrical cord through which power is provided from the computer to the mouse and position information is provided from the mouse to the computer. A cordless mouse utilizes a rechargeable or replaceable battery as its power source and radio frequency (RF) signals to communicate position information to the computer. While conventional position tracking systems work well, the electrical cord of a corded mouse can restrict a user's freedom of movement and the power source of a cordless mouse requires constant recharging or replacement.

For these and other reasons, a need exists for the present invention.

SUMMARY

One aspect of the present invention provides a system for generating position information including a first set of image data, a second set of image data, and a processor. The first set of image data is generated to indicate the position of a surface plane marker. The second set of image data is generated to indicate the position of a retroreflector. The processor is configured to receive the first and second sets of image data and to generate position information indicative of the relative position of the surface plane marker relative to the retroreflector.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
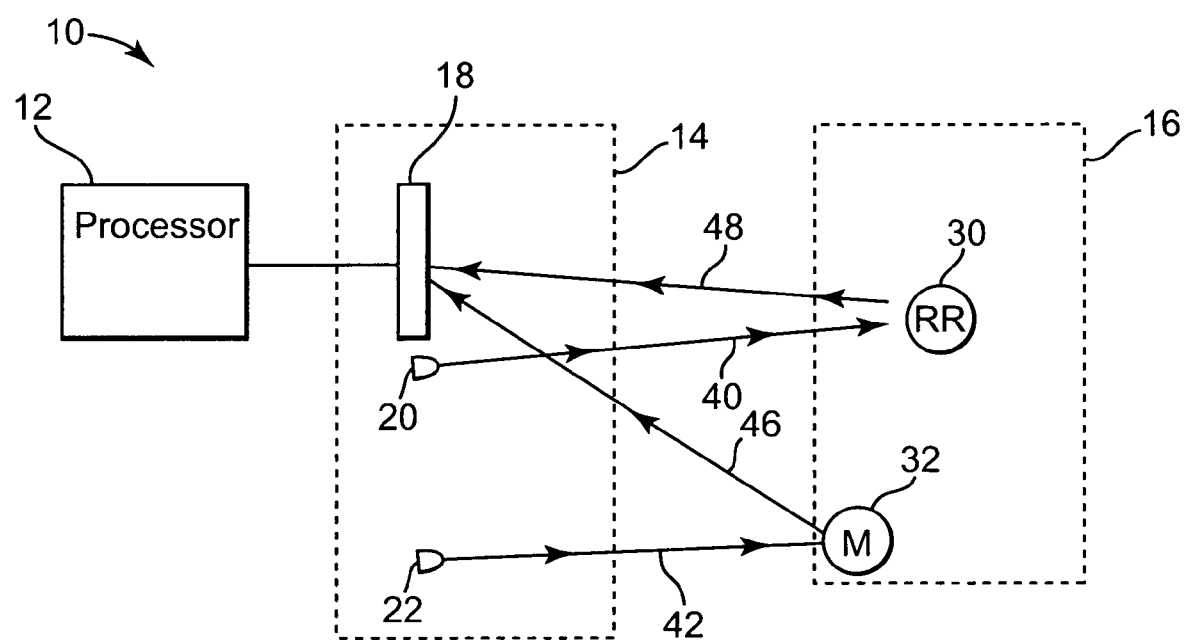
FIG. 1 illustrates a system for generating position information including a retroreflector, an image collection system, and a processor.

FIG. 1 illustrates a system 10 for generating position information that includes a processor 12, an image collection system 14, and a surface plane 16. In one embodiment, image collection system 14 includes an imager 18 and first and second light sources 20 and 22 that output light 40 and 42, respectively. In one embodiment, surface plane 16 defines the region within which image collection system 14 collects images, and surface plane 16 includes retroreflector 30 and surface marker 32. In an embodiment, the imager is implemented with a complementary metal-oxide semiconductor (CMOS) image sensor. In other embodiments, the imager is implemented with other types of imaging devices such as, for example, a charge-coupled device (CCD) imager. In an embodiment, the imager includes a sensor comprised of pixels. In an embodiment, the light sources are implemented as light-emitting diodes (LEDs) or lasers.

In operation of one embodiment, surface marker 32 is used to designate a location of surface plane 16, and it is fixed relative to surface plane 16. For example, surface marker 32 can designate one corner of surface plane 16. Multiple surface markers can also be used consistent with the present invention. In one embodiment, retroreflector 30 is coupled to a pointing device that is moved within surface plane 16, and thus retroreflector 30 is moved relative to surface marker 32. System 10 is configured to track the relative movement of retroreflector 30 and surface marker 32.

In one embodiment, first light source 20 outputs corresponding light 40, which then illuminates retroreflector 30. Reflecting light 48 is reflected from retroreflector 30 and detected by imager 18. A first set of imaging data is then generated from this reflected light 48 detected by imager 18 and sent to processor 12. In one embodiment, second light source 22 outputs corresponding light 42, which then illuminates surface marker 32. Reflecting light 46 is reflected from surface marker 32 and detected by imager 18. A second set of imaging data is then generated from this reflected light 46 detected by imager 18 and sent to processor 12.

In this way, image collection system 14 is configured to collect at least two sets of image data, where a first set of image data includes an indication of the position of retroreflector 30, and the second set of image data includes an indication of the position of surface marker 32. Processor 12 then receives the two sets of image data in order to generate relative position information of retroreflector 30 to surface marker 32.

In one embodiment, retroreflector 30 can be used in a pointing application, for example, as a mouse in a GUI-based computer. In one embodiment, the retroreflector constitutes part of a pointing device that can be held and or moved by a user. When used in a pointing application, it is desirable to have the ability to emulate certain commands via the pointing device. For example, it is desirable to be able to convey conventional mouse functions such as "clicking," "dragging," "scrolling," and lift detection.

Figure 2:
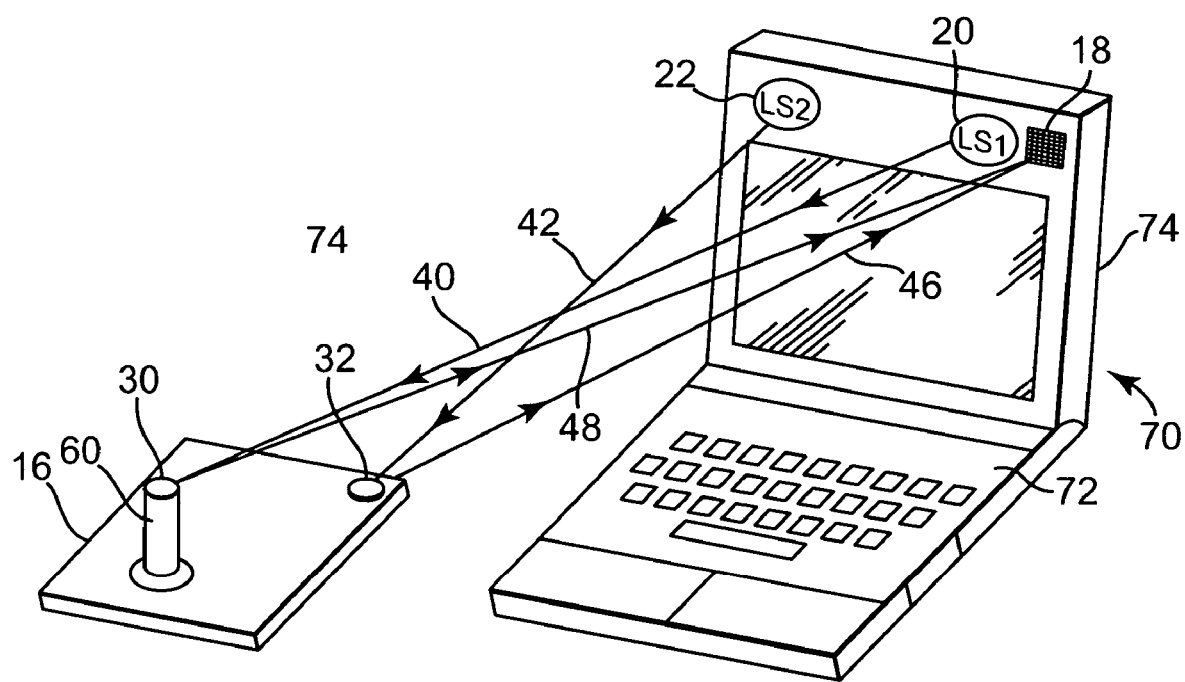
FIG. 2 illustrates one embodiment of a system for generating position information.

For example, One embodiment of the basic operation of the system of FIG. 1 is illustrated in FIG. 2. FIG. 2 illustrates an example of generating position information with a position tracking system, image collection system and a pointing device integrated with a computer system. Illustrated is a portable or "laptop" computer 70 configured with a base housing 72 and a screen housing 74. An image collection system that includes first and second light sources 20 and 22 and an imager 18 is mounted in screen housing 72 of computer 70. Retroreflector 30 is connected to a pointing device 60 that is configured to be held in a hand of a user and moved over surface plane 16. Surface marker 32 is fixed to surface plane 16, and in the illustration it is fixed to the upper corner. As pointing device 60, and thus retroreflector 30, is moved by the hand of a user, imager 18 tracks reflecting light 46 from surface marker 32 and reflecting light 48 from retroreflector 30 in order to obtain position information to be used by computer 70. In one embodiment, the position information is used to convey conventional mouse functions.

In one embodiment, first light source 20 is configured to illuminate the general area of surface plane 16 with light 40. Thus, light 40 illuminates retroreflector 30 as it is moved about surface plane 16. Reflecting light 48 is reflected from retroreflector 30 and detected by imager 18, which is configured to image the general area of surface plane 16. In this way, the first set of imaging data is generated from this reflected light 48 detected by imager 18 and is then sent to a processor within computer 70. In one embodiment, second light source 22 is also configured to illuminate the general area of if surface plane 16 with light 42. Thus, light 42 illuminates surface marker 32. Reflecting light 46 is reflected from surface marker 32 and detected by imager 18. In this way, the second set of imaging data is generated from this reflected light 46 detected by imager 18 and is then sent to the processor within computer 70.

By collecting the first set of image data, which includes an indication of the position of retroreflector 30, and collecting the second set of image data, which includes an indication of the position of surface marker 32, position information of retroreflector 30 relative to surface marker 32 can be generated. In this way, the position of retroreflector 30 can be tracked relative to surface marker 32, rather than relative to imager 18.

In applications where the position of retroreflector 30 is tracked only with respect to imager 18, any relative movement between retroreflector 30 and imager 18 is perceived as movement of the retroreflector 30. In cases where the position tracking system and image collection system are integrated with a computer system, such as computer 70 of FIG. 2, however, some relative movement between retroreflector 30 and imager 18 may not actually be intended movement of the retroreflector 30. For example, if computer 70 is placed on a seat tray of an airplane, automobile or other mobile application, vibration can cause movement of screen housing 72 in which imager 18 is mounted. This vibration can cause significant relative motion between retroreflector 30 and imager 18, but this relative motion caused by vibration of the computer housing is not intended to be translated as purposeful motion of indicative of positioning commands via pointing device 60.

Because system 10 generates position information that tracks the relative motion of the retroreflector 30 and surface plane 16, however, any movement of retroreflector 30 relative to imager 18 caused by inadvertent motion does not adversely affect the position information. As such, even where system 10 is integrated in to computer 70 as illustrated in FIG. 2, and is subjected to an application with significant vibration, relative motion between retroreflector 30 and imager 18 does not interfere with the position information generated from the first and second sets of image data.

Surface plane 16 can be any of a variety of configurations consistent with the present invention. For example, surface plane 16 can be an area on base housing 72 integrated within computer 70. The size and shape of surface plane 16 can be varied, and it provides an area over which pointing device 60 can be moved. Similarly, surface marker 32 can be of a variety of configurations consistent with the present invention. For example, surface marker 32 can be a plurality of markers in each of the corners of surface plane 16.

In one embodiment, surface marker 32 is a retroreflector, in another surface marker 32 is a plurality of retroreflectors, and another surface marker 32 is a feature or features on surface plane 16. For example, a unique pattern of colors and/or shapes could be placed on surface plane 16 to function as surface marker 32.

In yet another embodiment, surface marker 32 is simply features of surface plane 16 that are evident in images acquired by imager 18. Image stabilization processing techniques are then applied to the acquired images by processor 12. Such techniques track the motion of retroreflector 30 relative to the features of surface plane 16 that are evident in the acquired images.

Figure 3:
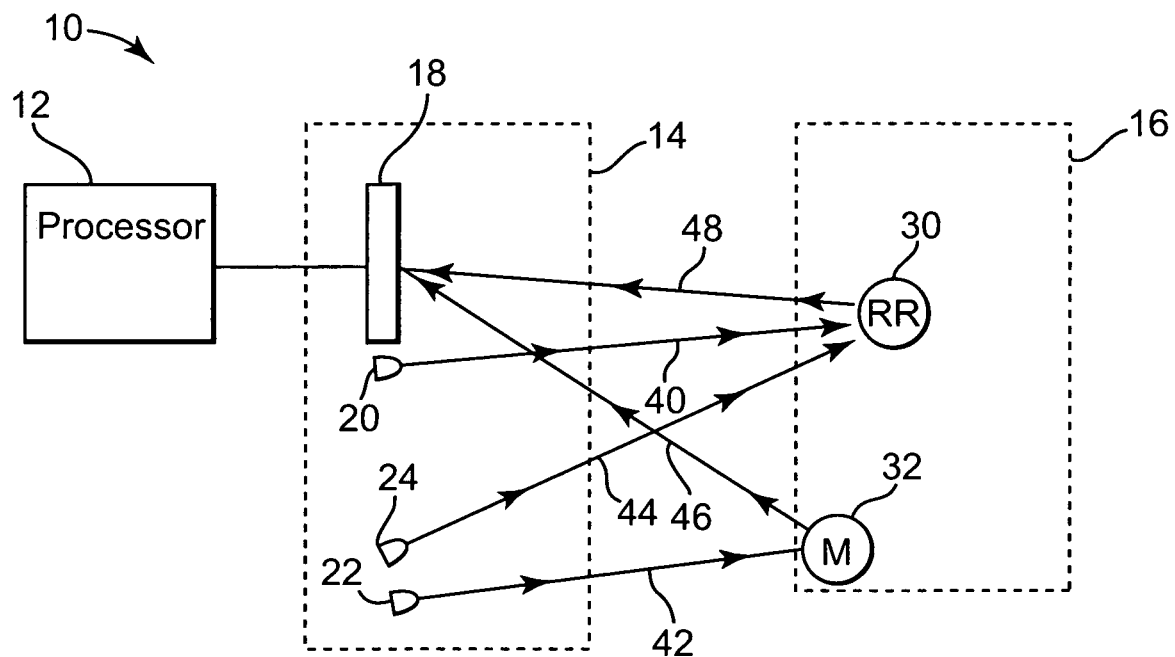
FIG. 3 illustrates one embodiment of a system for generating position information including a retroreflector, an image collection system with multiple light sources, and a processor.

FIG. 3 illustrates another embodiment that uses an additional light source, third light source 24, which along with first light source 20, is used to generate the first set of image data indicative of the position of retroreflector 30. In this embodiment, first light source 20 is located closer to the imager 18 than the third light source 24 and these two light sources and the imager are located in the same plane. The first light source 20 is referred to herein as the "on-axis" light source and the third light source 24 is referred to herein as the "off-axis" light source. Furthermore, in this embodiment light sources 20, 22 and 24 are configured to output corresponding light 40, 42 and 44 having different wavelengths.

Figure 4:
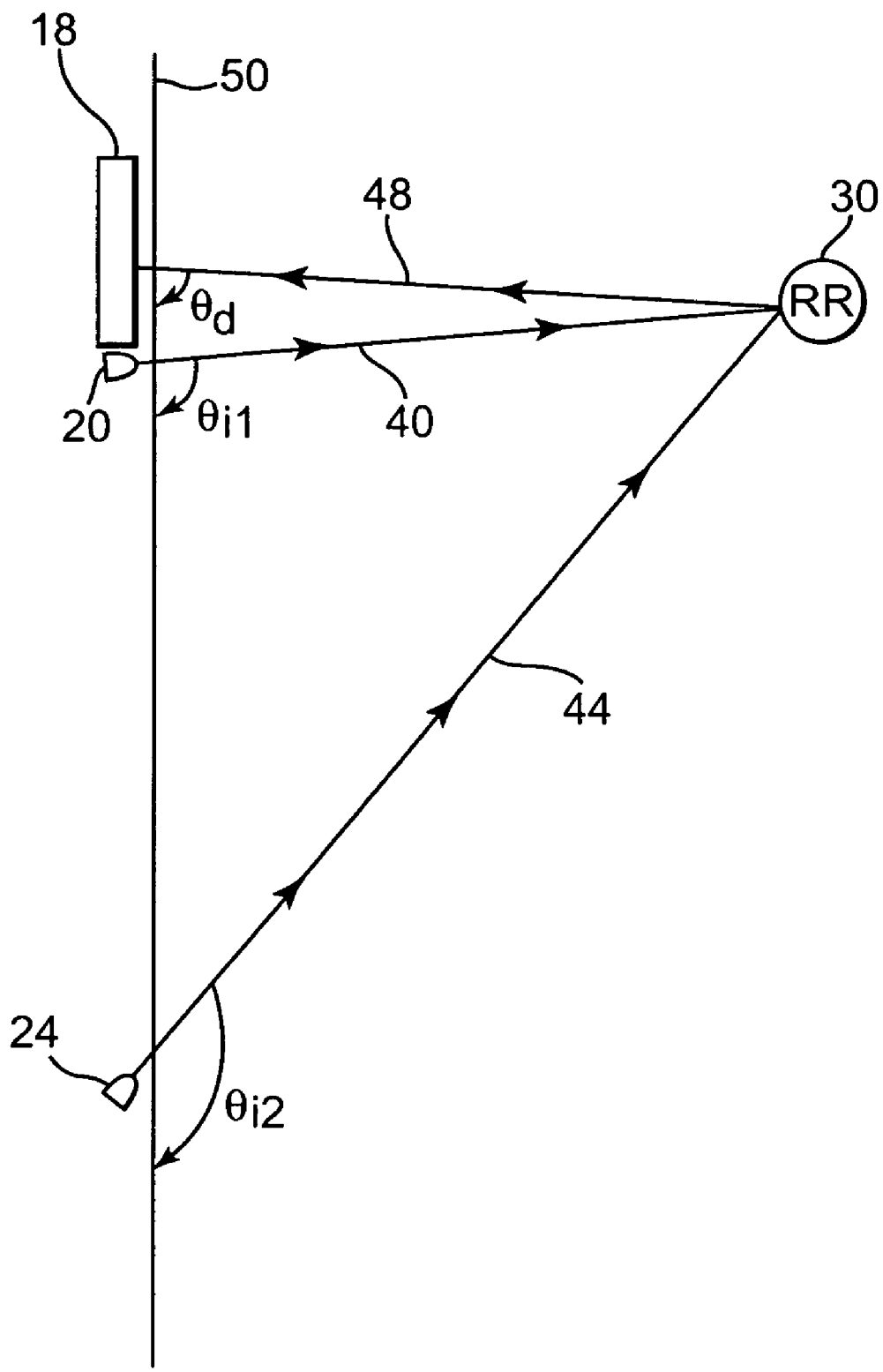
FIG. 4 illustrates the detection angle, the on-axis illumination angle, and the off-axis illumination angle in the system of FIG. 3.

The angle at which light from a light source 20, 24 illuminates the retroreflector 30 is referred to as the illumination angle. Referring to FIG. 4, the illumination angle is measured relative to a plane (as indicated by dashed line 50) that is coplanar with the plane of the major surface of the imager 18. The illumination angle of light source 20 is identified as $\theta_{i1}$ and the illumination angle of light source 24 is identified as $\theta_{i2}$. The angle at which light 48 reflected from retroreflector 30 is incident on the imager is referred to as the detection angle. The detection angle is identified as $\theta_d$ and is measured relative to the same plane as the illumination angle. In the case of two illumination angles, $\theta_{i1}$ and $\theta_{i2}$, the term "on-axis" applies to the light source or the illuminating beam whose illumination angle has the smaller difference from the detection angle, $\theta_d$, and the term "off-axis" refers to the light source or the illumination beam whose illumination angle has the largest difference from the detection angle. Referring to FIG. 2, the relationship of the illumination and detection angles is mathematically expressed as: $|\theta_{i1}-\theta_d|<|\theta_{i2}-\theta_d|$.

Additional embodiments of systems for generating position information including a retroreflector and an image collection system with multiple light sources are also described, for example, in related U.S. patent application, entitled "Position determination utilizing a cordless device," application Ser. No. 11/111,444, filed Apr. 21, 2005, assigned to the assignee of the present invention and incorporated herein by reference.

In one such embodiment using multiple light sources to illuminate a retroreflector, such as illustrated in FIG. 3, the first set of image data indicative of the position of retroreflector 30 collected by image collection system 14 includes at least two subsets of image data. The first subset of image data, referred to herein as the on-axis image data, is collected in response to light at wavelength λ1 generated by first light source 20 and the second subset of image data, referred to herein as the off-axis image data, is collected in response to light of wavelength λ2 generated by second light source 24. The on-axis image data is representative of light of wavelength λ1 that reflects off retroreflector 30 and any other objects that are illuminated by light source 20. The off-axis image data is representative of light of wavelength λ2 that reflects off the retroreflector 30 and any other objects that are illuminated by light source 24. Because the on-axis illumination angle is closer to the detection angle than the off-axis illumination angle, the on-axis image data will include a stronger indication of retroreflector 30 relative to the off-axis image data. In this case, the intensity of light reflected by retroreflector 30 to the imager 18 will be much greater at wavelength λ1 than at wavelength λ2. Therefore, the intensity values at data points related to retroreflector 30 will be higher in the on-axis image data than at corresponding data points in the off-axis image data.

In one such embodiment, the difference in the intensities of light that is reflected from retroreflector 30 at the two wavelengths is used to generate position information for retroreflector 30. In the same way, another light source can be added such that two light sources, on and off-axis, can be used for illuminating surface marker 32 in order to generate the second set of image data indicative of the position of marker 32.

In one embodiment, imager 18 can be configured to distinguish light of the two wavelengths used for illumination. This can be done, for example, by locating a checkerboard filter pattern in front of the imager. An example of a hybrid filter for an imager that includes a bulk filter with two peaks and a checkerboard filter pattern is described in related U.S. patent applications both entitled "Method and system for wavelength-dependent imaging and detection using a hybrid filter," application Ser. No. 10/739,831, filed on Dec. 18, 2003 and application Ser. No. 10/843,517, filed on May 10, 2004, both of which are assigned to the assignee of the current invention and incorporated by reference herein.

Alternatively, two sets of image data can be collected sequentially. For example, the imager and light sources can be coordinated so a first set of image data is collected while only the first light source is activated and the second set of image data is collected while only the second light source is activated. The sequential activation of light sources and collection of the image data can be controlled by the processor. Although one example of sequentially collecting the two sets of image data is described, other sequential collection techniques are possible.

Whether one or more light sources are used, system 10 is configured to collect a first set of imaging data indicative of the position of a retroreflector and a second set of imaging data indicative of the position of a surface marker such that the relative position of the retroreflector relative to the surface marker can be calculated and tracked. Relative position information can then be calculated and used, for example, in a computer to convey conventional mouse functions.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for generating position information, the system comprising:
    means for generating a first set of image data indicative of the position of a surface plane marker;
    means for generating a second set of image data indicative of the position of a retroreflector;
    a processor configured to receive the first and second sets of image data and to generate position information indicative of the relative position of the surface plane marker relative to the retroreflector;
    wherein the retroreflector is coupled to a pointing device, wherein the surface plane marker is fixed to a surface plane and located in a fixed position on the surface plane, wherein the pointing device and retroreflector are movable over the surface plane and relative to the surface plane marker, wherein the system includes a computer, and wherein the position information is used to convey computer mouse functions.

2. The system of claim 1, further comprising an image collection system configured to generate the first set of image data and the second set of image data.

3. The system of claim 2, wherein the image collection system further comprises light sources and an imager for collecting images of the surface plane, including the surface plane marker and retroreflector.

4. A system for generating position information, the system comprising:
    a reflector coupled to a pointing device;
    a marker fixed to a surface plane and located in a fixed position on the surface plane;
    an image collection system configured to generate a first set of image data and a second set of image data, wherein the first set of image data includes an indication of the reflector position and the second set of image data includes an indication of the marker position; and
    a processor configured to use the first set of image data and the second set of image data to generate position information indicative of the relative position of the marker relative to the reflector;
    wherein the pointing device and reflector are configured to move over the surface plane and relative to the marker and such that the processor is configured to use the first set of image data and the second set of image data to track the relative movement of the reflector relative to the marker, wherein the system includes a computer into which the image collection system is integrated, and wherein the position information is used to convey mouse commands.

5. The system of claim 4, wherein the marker is a second reflector.

6. The system of claim 5, wherein the reflector and the second reflector are each retroreflectors.

7. A method for generating position information, the method comprising:
    coupling a retroreflector to a pointing device;
    moving the pointing device and the retroreflector on a surface plane and relative to a surface plane marker, wherein the surface plane marker is fixed to the surface plane and located in a fixed position on the surface plane;
    generating a first set of image data indicative of the position of the surface plane marker;
    generating a second set of image data indicative of the position of the retroreflector;

generating position information indicative of the relative position of the surface plane marker relative to the retroreflector; and conveying mouse functions with the position information.

8. The method of claim 7, further comprising generating the first set of image data and the second set of image data with an image collection system.

9. The method of claim 8, further comprising collecting images of the surface plane, including the surface plane marker and retroreflector, with the image collection system, the image collection system comprising light sources and an imager.

10. The method of claim 8, further comprising integrating the image collection system into a computer.

11. A method for generating position information for a system, the method comprising:
coupling a retroreflector to a pointing device;
moving the pointing device and the retroreflector on a surface plane and relative to a surface plane marker, wherein the surface plane marker is fixed to the surface plane and located in a fixed position on the surface plane;
generating a first set of image data indicative of the position of the reflector that is coupled to the pointing device;
generating a second set of image data indicative of the position of the marker that is located in a fixed position on the surface plane;

processing the first set of image data and the second set of image data to generate position information indicative of the position of the marker relative to the reflector as the pointing device is moved relative to the surface plane; and generating position information within a computer system, wherein the position information is used to convey mouse functions.

12. The system of claim 1, wherein the surface plane marker is fixed to a computer housing.

13. The system of claim 12, wherein the image collection system is mounted in a screen housing of a computer.

14. The system of claim 13, wherein the pointing device is separate from the computer.

15. The system of claim 1, wherein the surface plane marker comprises features of the surface plane.

16. The system of claim 15, wherein the processor is configured to track movements of the pointing device relative to the features of the surface plane as the pointing device moves over the surface plane.

17. The system of claim 16, wherein the pointing device comprises a computer mouse.

* * * * *